April 1, 1958     G. TESTORI     2,829,358
CONNECTORS WITH COUPLING LOCK
Filed June 15, 1956     3 Sheets-Sheet 1
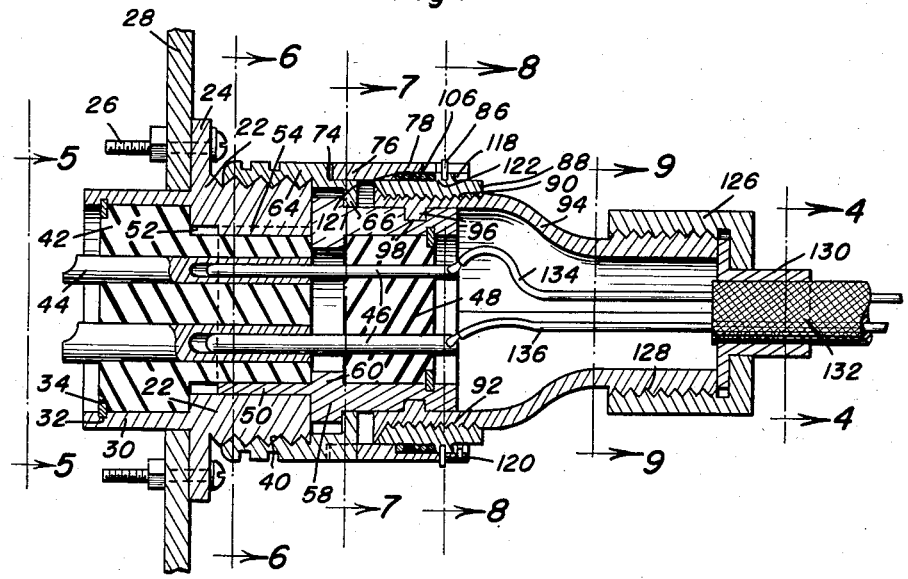
Fig. 1
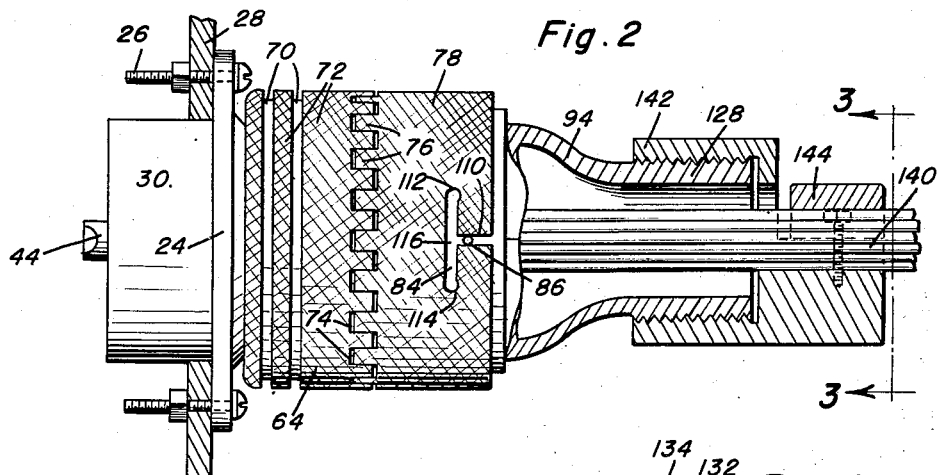
Fig. 2
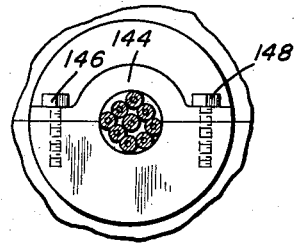
Fig. 3
Fig. 4
Giglio Testori    INVENTOR.
BY *Clarence A. O'Brien*
*and Harvey B. Jackson*
Attorneys April 1, 1958 G. TESTORI 2,829,358
CONNECTORS WITH COUPLING LOCK
Filed June 15, 1956 3 Sheets-Sheet 2

Giglio Testori INVENTOR.

BY *Clarence A. O'Brien*
and *Harvey B. Jacobson*
Attorneys

United States Patent Office 2,829,358
Patented Apr. 1, 1958

2,829,358

CONNECTORS WITH COUPLING LOCK

Giglio Testori, Salt Lake City, Utah

Application June 15, 1956, Serial No. 591,661

4 Claims. (Cl. 339—91)

This invention relates to the class of electrical connectors and more particular to an electrical receptacle having incorporated therein a novel locking arrangement.

The primary object of the present invention resides in the provision of an electrical receptacle incorporating therein a locking device adapted to prevent accidental interruption of electrical circuits due to the receptacle vibrating or working loose while located in areas of high vibration, such as when used on electrical or electronic equipment installed or used in jet engine aircrafts, reciprocating engine aircraft, pilotless aircraft, warships, and various types of dirigible vehicles and the like.

Present day conventional electrical receptacles are usually so constructed that a safety wire must be attached the gland nut thereof and anchored to an immovable object to prevent the gland nut from turning and thus unscrewing to become loose when located in areas of high vibration. This use of a safety wire as a locking provision is quite inadequate due to the safety wire coming loose or breaking and the time consumed in the installation thereof. This time consumption is a definite waste of man hours in the construction and maintenance of aircraft where electrical or electronic equipment must be removed and replaced periodically for bench checking, trouble shooting and the like as well as for various other types of inspections.

The present invention avoids the difficulties in installation of electrical receptacles by providing a positive electrical engagement which is simple to connect and disconnect, yet which is very rugged and positive locking and resistive to becoming loose due to vibration so that accidental disruption of the electrical circuits are avoided and excessive man hours are not wasted in connecting the electrical receptacle, especially in close quarters such as in the wings of aircraft where oftentimes only one hand can be used to install or remove a receptacle.

A further object of the invention resides in the provision of an electrical receptacle adapted for installation in various type places where it is necessary to provide a device employing positive means for locking the components of the electrical receptacles.

Still further objects and features of this invention reside in the provision of an electrical receptacle that is comparatively simple in construction and fabrication, which employs a novel locking arrangement including a locking ring assembly which is threaded oppositely to a gland nut and which includes a locking ring slide having ribs thereon spring pressed into engagement with the gland nut.

These, together with the various ancillary objects and features of the invention which will become apparent as the following description proceeds, are attained by this electrical receptacle, preferred embodiments of which have been illustrated in the accompanying drawings, by way of example only, wherein:

Figure 1 is a longitudinal sectional view of an embodiment of the electrical receptacle for use in connection to a conduit;

Figure 2 is a longitudinal elevational view of a modified form of electrical receptacle employing means for clampingly holding a bundle of wires rather than a conduit;

Figure 3 is a sectional detail view as taken along the plane of line 3—3 of Figure 2 illustrating in particular the construction of the clamping means;

Figure 4 is an enlarged sectional detail view as taken along the line 4—4 in Figure 1 illustrating the arrangement of the construction of the conduit ferrule which is clampingly held in overlying relationship with respect to the conduit;

Figure 5:
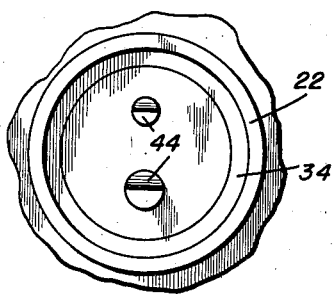
Figure 5 is a sectional detail view as taken along the plane of line 5—5 in Figure 1 illustrating in particular the arrangement of parts of the insulative body having a first set of contacts embodied therein and of the retaining ring which holds the insulative body in position.
Figure 6:
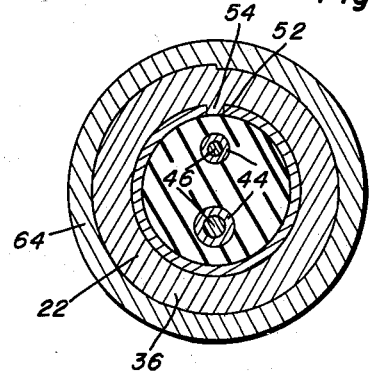
Figure 6 is a sectional detail view as taken along the plane of line 6—6 in Figure 1 illustrating the telescoping engagement of the sets of contacts.
Figure 7:
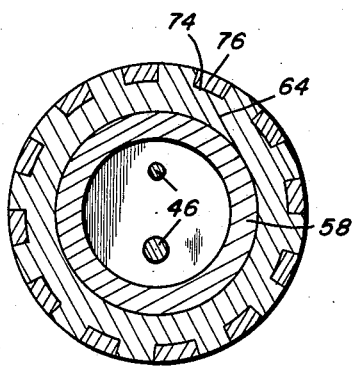
Figure 7 is a sectional detail view as taken along the plane of line 7—7 in Figure 1 illustrating the arrangement of the ribs attached to the slide and engaged in the recesses in the gland nut.
Figure 8:
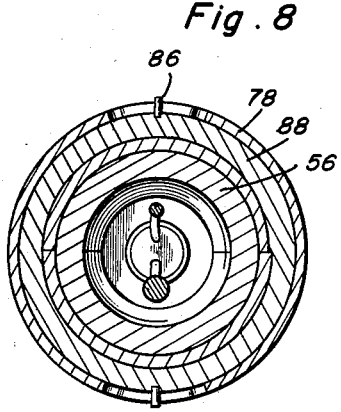
Figure 8 is a sectional detail view as taken along the plane of line 8—8 in Figure 1 illustrating the details of construction of the connections between the split casing and the locking ring assembly and between the inner cylindrical member and the split casing.
Figure 11:
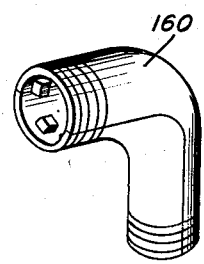
Figure 11 is a perspective view of a modified form of split casing of generally elbow shape.
Figure 9:
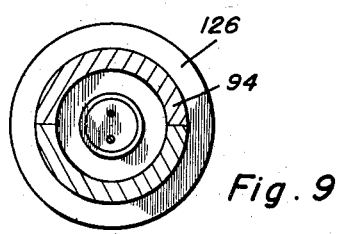
Figure 9 is a sectional detail view as taken along the plane of line 9—9 in Figure 1 illustrating the conduit adapter gland nut and flanged conduit adapter.

With continuing reference to the accompanying drawing wherein like reference numerals designate similar parts throughout the various views, reference numeral 20 generally designates the electrical connector comprising the present invention. Utilized in this invention is a housing 22 having a flange 24 which may be apertured for reception of bolts 26 or other suitable fasteners used in mounting the electrical receptacle on a suitable mounting plate 28 or the like. The housing 22 is provided with a cylindrical portion 30 which is grooved as at 32 for reception of a split retaining ring 34 or the like and has a portion 36 o considerably greater thickness forming a shoulder as at 38. The thickened portion 36 is externally threaded as at 40.

Seated in the housing 22 and held in place by the ring 34 is a first insulative body 42 which has any suitable number of contacts 44 of any desired shape or size embedded therein. These contacts may be male or female and cooperate with the set of contacts 46 which may conversely be female or male as the case may be so that there is telescoping engagement with the set of contacts 44 and the set of contacts 46. The set of contacts 46 are embedded in a second insulative body 48.

Extending into the thickened portion 36 of the housing 22 is an inner cylindrical body 50 slotted as at 52 to engage in key 54 which is an integral part of thickened portion 36 of housing 22 to prevent relative rotation of the inner cylindrical member 50 and the housing 22. The inner cylindrical member has a peripheral flange 58 at approximately the median point thereof as well as a corresponding inner shoulder or flange 60. This flange serves to hold the second insulative body 48 in spaced relation with respect to the first insulative body and further cooperates with the retaining ring 62 to hold the second insulative body 48 securely in position.

Figure 10:
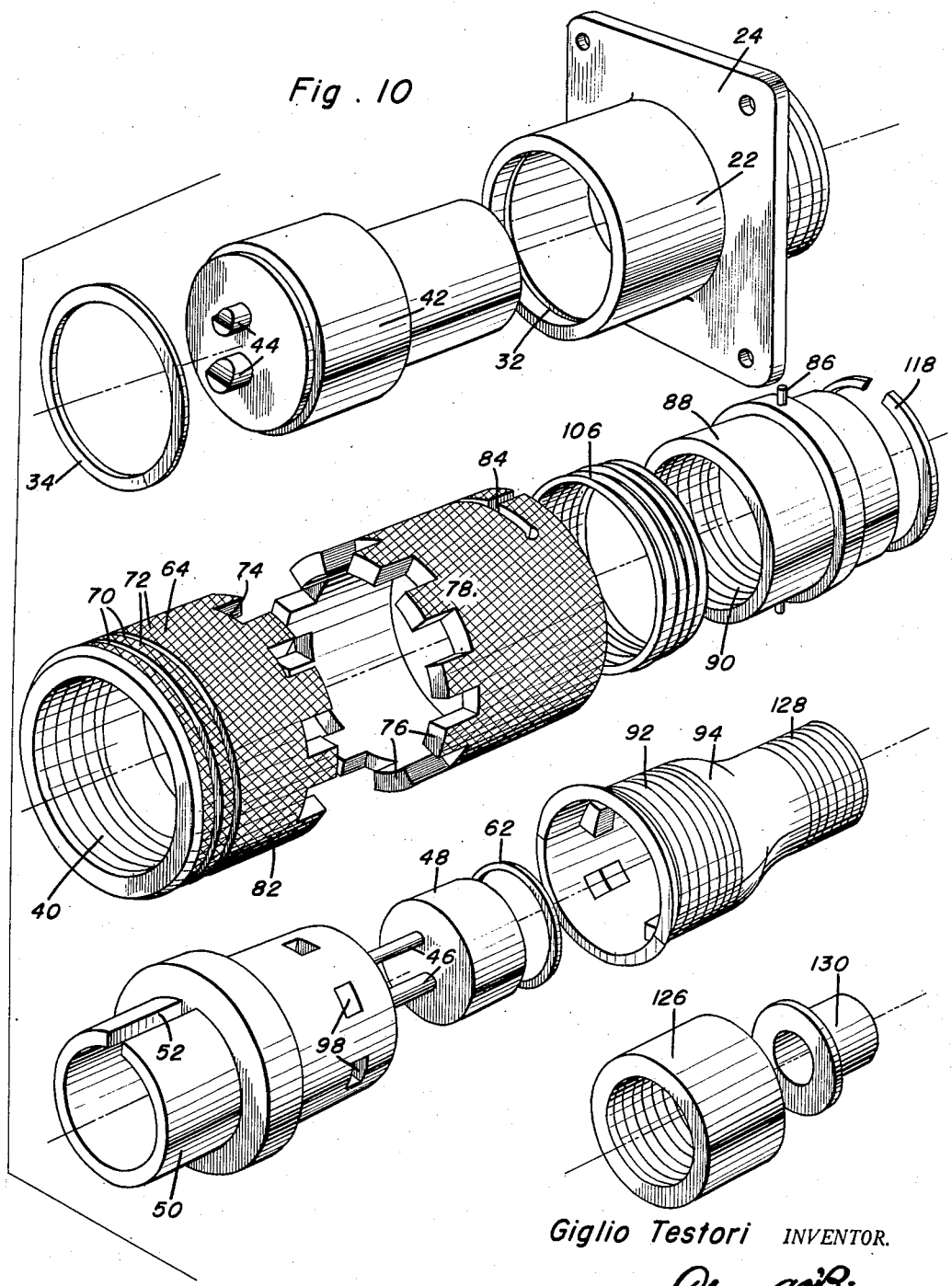
Figure 10 is an exploded perspective view of the embodiment of the invention as shown in Figure 1.

Threadedly secured on the housing 22 is a gland nut 64 which is provided with a lip 66 adapted to engage the flange 58 so that upon clockwise rotation of the gland nut 64 the flange or lip 66 will engage the flange 58 and urge the inner cylindrical member 50 to move longitudinally thus drawing the second insulative body 48 and the associated set of contacts 46 towards the first insulative body 42 thus further telescoping the sets of contacts 44 and 46. The gland nut 64 may be provided with suitable grooves and knurls as at 70 and 72 for added ease in gripping the gland nut 64 for rotation thereof and for decorative appearance. The gland nut 64 is provided with a plurality of recesses 74 therein for reception of the ribs 76 preferably integrally formed with the locking ring slide 78 of a locking ring assembly 80. The outer surface of the slide 78 is knurled as at 82, see Figure 10. A plurality of substantially T-shaped slots 84 are formed in the slide 78 for reception of pins or rivets 86 which are affixed to the locking ring housing 88. The locking ring housing 88 is internally threaded as at 90 for threaded engagement on the externally threaded portions 92 of a split casing 94 provided with a series of projections 96 which fit within recesses or depressions 98 in the inner cylindrical member 50 to hold the casing 94 in locked engagement with inner cylindrical member 50. Slide 78 incorporating ribs 76 is provided with a groove 120 into which retaining ring 118 is seated and with T-shaped slots to receive guide pins 86, and provided with a shoulder 121 on which spring 106 bottoms, the spring also engaging shoulder 122 on the locking ring housing 88 to urge the ribs 76 into the recesses 74. Obviously in lieu of the single spring 106 as is shown, a plurality of springs may be utilized as desired. The casing 94 and hence the housing 88 is threaded in the opposite direction from that of the gland nut 64 and housing 22 so that counterclockwise rotation thereof will urge the slide toward the gland nut. The lock ring housing is already seated against the tapered forward flange of casing 94 and hence any counterclockwise rotation will cause the lock ring housing 88 to seat more tightly on the flange, thereby allowing no further counterclockwise rotation. Since there can be no further relative rotation of the gland nut and locking ring assembly, rotation in either direction will only serve to further lock the electrical connector comprising the present invention.

The pin or pins 86 serve a two-fold purpose. The pins 86 tend to fasten the locking ring slide 78 and the locking ring housing 88 together thereby preventing them from rotating in opposite directions yet permitting the locking ring slide to slide forward towards the gland nut and backwards in the opposite direction from the gland nut. The guide pins 86 further serve as a holdback for the slide 78 to hold the ribs 76 out of the recesses 74 whenever the gland nut is being moved or installed on the receptacle. If there were no such holdback provision, the ribs 76 would be engaged in the recesses 74 every time they become aligned due to the action of the spring 106 making the installation or removal of the receptacle 20 by turning the gland nut virtually impossible.

During the normal or locked position of the receptacle 20 the locking ring slide 78 is positioned with the guide pins 86 resting in stem portion 110 of the T-shaped slot 84. However, when the hold-back feature is employed the locking ring slide 78 can be slid back in opposite direction from the gland nut 64 and turned slightly clockwise in transverse portion 116 of T-shaped slot 84 so as to seat depression 114 over pin 86 when installing the receptacle by clockwise rotation of gland nut 64, or slightly counterclockwise rotation in transverse portion 116 of T-shaped slot 84 so as to seat depression 112 over pin 86 when removing the receptacle by counterclockwise rotation of gland nut 64.

A retaining ring 118 is seated in a groove 120 in the slide 78 and engages the shoulder 122 of the locking ring housing 88. This serves to prevent the locking ring slide from becoming detached from the locking ring housing 88.

The split casing 94 as heretofore recited is securely locked on the inner cylinder 50 by means of the projections 96 which seat on the depressions 98. A conduit adapter gland nut 126 is threadedly secured on the external threaded portion 128 of the split casing 94 and in cooperation with a flanged conduit adapter 130 serve to engage and hold a conduit 132 with the conductors 134 and 136 of the conduit 132 secured to the contacts 46. If, however, a plurality of individual conductors or wires 140 are being utilized in lieu of a conduit 132, the wire bundle adapter 142 can be utilized which includes a clamping plate 144 which by means of screw fasteners 146 and 148 serve to clampingly hold the wires to the adapter 142 which is threadedly received on the threaded portion 128 of the split casing 94.

It is to be noted that in lieu of the split casing 94 a split casing 160 can be utilized which is provided with projections 162 serving in the same manner as the projections 96. The only difference in this particular form of the invention is that the split casing 160 is of an elbow shape.

The electrical connector can be made of various materials it being noted that material such as stainless steel for the spring 106 is highly desirable.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An electrical receptacle comprising an outer housing, said housing being externally threaded, a first insulative body in said housing, a first set of contacts embedded in said first insulative body, an inner cylindrical member partially received in said housing, a second insulative body in said inner cylindrical member, a second set of contacts embedded in said second insulative body telescopingly engaging said first set of contacts, a split casing received over a portion of said inner cylindrical member, said split casing being externally threaded oppositely with respect to said externally threaded housing, a gland nut threadedly engaged on said housing, and a locking ring assembly threadedly engaged on said casing, said locking ring assembly being engageable with said gland nut, said gland nut having a series of recesses therein, said locking ring assembly including a locking ring housing, a locking ring slide having a series of ribs thereon, and a spring in said locking ring housing urging said locking ring slide outwardly of said locking ring housing and said ribs into said recesses, and means for selectively holding said locking ring slide away from said gland nut including at least one pin secured to said locking ring housing, said locking ring slide having at least one T-shaped slot therein with said pin engaged in said slot.

2. An electrical receptacle comprising an outer housing, said housing being externaly threaded, a first insulative body in said housing, a first set of contacts embedded in said first insulative body, an inner cylindrical member partially received in said housing, a second insulative body in said inner cylindrical member, a second set of contacts embedded in said second insulative body telescopingly engaging said first set of contacts, a split casing received over a portion of said inner cylindrical member, said split casing being externally threaded oppositely with respect to said externally threaded housing, a gland nut threadedly engaged on said housing, a locking ring assembly threadedly engaged on said casing, said locking ring assembly being engageable with said gland nut, said gland nut having a series of recesses therein, said locking ring assembly including a locking ring housing, a locking ring slide having a series of ribs thereon, and a spring in said locking ring housing urging said locking ring slide outwardly of said locking ring housing and said ribs into said recesses, and a retaining ring secured to said locking ring housing engaging a lip on said locking ring slide to limit the movement of said locking ring slide outwardly, and means for selectively holding said locking ring slide away from said gland nut including at least one pin secured to said locking ring housing, said locking ring slide having at least one T-shaped slot therein wtih said pin engaged in said slot.

3. An electrical receptacle comprising an outer housing, said housing being externally threaded, a first insulative body in said housing, a first set of contacts embedded in said first insulative body, an inner cylindrical member partially received in said housing, a second insulative body in said inner cylindrical member, a second set of contacts embedded in said second insulative body telescopingly engaging said first set of contacts, a split casing received over a portion of said inner cylindrical member, said split casing being externally threaded oppositely with respect to said externally threaded housing, a gland nut threadedly engaged on said housing, a locking ring assembly threadedly engaged on said casing, said locking ring assembly being engageable with said gland nut, means keying said inner cylindrical member to said outer housing to prevent relative rotation therebetween, retaining means carried by said inner cylindrical member engaging said second insulative body, a lip on said gland nut engaging a flange on said inner cylindrical member to urge said second insulative body towards said first insulative body and to telescope said first and second sets of contacts, said gland nut having a series of recesses therein, said locking ring assembly including a locking ring housing, a locking ring slide having a series of ribs thereon, a spring in said locking ring housing urging said locking ring slide outwardly of said locking ring housing and said ribs into said recesses, and means for selectively holding said locking ring slide away from said gland nut including at least one pin secured to said locking ring housing, said locking ring slide having at least one T-shaped slot therein with said pin engaged in said slot.

4. An electrical receptacle comprising an outer housing, said housing being externally threaded, a first insulative body in said housing, a first set of contacts embedded in said first insulative body, an inner cylindrical member partially received in said housing, a second insulative body in said inner cylindrical member, a second set of contacts embedded in said second insulative body telescopingly engaging said first set of contacts, a split casing received over a portion of said inner cylindrical member, said split casing being externally threaded oppositely with respect to said externally threaded housing, a gland nut threadedly engaged on said housing, a locking ring assembly threadedly engaged on said casing, said locking ring assembly being engageable with said gland nut, means keying said inner cylindrical member to said outer housing to prevent relative rotation therebetween, retaining means carried by said inner cylindrical member engaging said second insulative body, a lip on said gland nut engaging a flange on said inner cylindrical member to urge said second insulative body towards said first insulative body and to telescope said first and second sets of contacts, said gland nut having a series of recesses therein, said locking ring assembly including a locking ring housing, a locking ring slide having a series of ribs thereon, a spring in said locking ring housing urging said locking ring slide outwardly of said locking ring housing and said ribs into said recesses, means for selectively holding said locking ring slide away from said gland nut including at least one pin secured to said locking ring housing, said locking ring slide having at least one T-shaped slot therein with said pin engaged in said slot, and a retaining ring secured to said locking ring housing engaging a lip on said locking ring slide to limit the movement of said locking ring slide outwardly.

References Cited in the file of this patent

UNITED STATES PATENTS

| | | |
|---|---|---|
| 2,371,551 | Schmitt | Mar. 13, 1945 |
| 2,728,895 | Quackenbush | Dec. 27, 1955 |